United States Patent [19]

Hurner

[11] Patent Number: 5,471,964
[45] Date of Patent: Dec. 5, 1995

[54] APPARATUS AND PROCESS FOR BLENDING AND TREATING FUEL

[76] Inventor: Erwin E. Hurner, 920 Belsly Blvd. South, Moorhead, Minn. 56560

[21] Appl. No.: 176,641

[22] Filed: Dec. 30, 1993

[51] Int. Cl.⁶ .................................................. F02M 37/20
[52] U.S. Cl. ........................... 123/514; 123/557; 210/177; 210/187
[58] Field of Search ..................... 123/557, 514, 123/552, 553, 543; 210/180, 185, 187, 186, 311, 306, 313, 299, 313, 303, 305, 436, 416.4, 175, 177, 172

[56] References Cited

U.S. PATENT DOCUMENTS

| | | |
|---|---|---|
| 4,397,288 | 8/1983 | Kelling . |
| 4,432,329 | 2/1984 | Redele ..................... 123/514 |
| 4,454,851 | 6/1984 | Bourbonnaud et al. ........ 123/514 |
| 4,481,931 | 11/1984 | Bruner ..................... 123/514 |
| 4,502,450 | 3/1985 | Duprez ..................... 123/514 |
| 4,574,762 | 3/1986 | Muller et al. .............. 123/514 |
| 4,624,779 | 11/1986 | Hurner . |
| 4,684,786 | 8/1987 | Mann et al. . |
| 4,748,960 | 6/1988 | Wolf . |
| 4,807,584 | 2/1989 | Davis . |
| 4,865,005 | 9/1989 | Griffith . |
| 4,986,907 | 1/1991 | Uzeta ...................... 123/514 |
| 4,995,992 | 2/1991 | Hurner . |
| 5,110,460 | 5/1992 | Gilas . |
| 5,207,203 | 5/1993 | Wagner et al. ............. 123/514 |

*Primary Examiner*—Marguerite Macy
*Attorney, Agent, or Firm*—Hardaway Law Firm

[57] ABSTRACT

A fuel treatment apparatus and process is provided utilizing a blending head thereon defining a plurality of passages therein including a first passage and a second passage connected by a blending passage which includes a thermostat for blocking off the blending passage. The blending head functions to direct fuel into a fuel treatment apparatus having a settling chamber with a fuel introducing conduit passing through the top of the chamber and extending to a lower portion of the chamber to define a fuel inlet in the lower portion of the chamber. A buoyant valve is located within the conduit to permit fuel introduction during normal operation but to close off the conduit during periods of non-operation thus closing off fluid communication between the fuel treatment apparatus and the fuel tank. A fuel outlet is provided to remove the fuel after the treatment. A recess in the bottom of the chamber has a drain in the bottom thereof for the removal of moisture from the bottom of the chamber. A secondary fuel inlet is provided to permit introduction of fuel when the normal fuel inlet is clogged, for example, by the freezing of collected moisture therein.

9 Claims, 3 Drawing Sheets

1

APPARATUS AND PROCESS FOR BLENDING AND TREATING FUEL

BACKGROUND OF THE INVENTION

This invention relates generally to the art of fuel treatment, and more particularly, to an apparatus and process for blending and heating diesel fuel and for removing contaminants from diesel fuel. Various devices exist within the prior art for the treatment of fuel for use in internal combustion engines. Diesel fuel in particular has required some substantial treatment in order to prevent contaminants or adverse weather conditions from affecting the combustion process.

U.S. Pat. No. 4,257,890 describes an apparatus for removing water from diesel fuel during normal operation of the vehicle. A significant advance in the treatment of diesel fuel is disclosed in U.S. Pat. No. 4,624,779, issued Nov. 5, 1986. Among the devices within the prior art for heating diesel fuel are U.S. Pat. Nos. 4,865,005; 4,807,584; 4,748,960; 4,684,786; 4,432,329; and 4,397,288.

U.S. Pat. No. 5,110,460 discloses a centrifugal separator for a liquid capable of waxing. The separator comprises an inlet duct for conveying diesel fuel to a deflector which imparts a centrifugal velocity thereto inside a centrifuging bowl. The centrifuged liquid rises and passes through a filter and then leaves through an outlet duct. An electrical resistance is incorporated in the solid metal of the lid to heat the two ducts. The lid is provided with fins for heating the diesel fuel in the vicinity of the filter.

While each of these apparatus perform well for their intended functions, a need has always existed for further improvement and devices for treating fuel for internal combustion engines.

SUMMARY OF THE INVENTION

It is thus an object of this invention to provide a novel apparatus and process for blending and heating fuel.

It is another object of this invention to provide an apparatus and process head for blending and heating fuel which utilizes return fuel from an engine to heat fuel going to an engine.

It is a further object of this invention to provide an apparatus and process for blending and heating fuel which automatically controls blending of fuels therein.

It is a still further object of this invention to provide an apparatus and process for blending and heating fuel which can be used as a part of a fuel treatment apparatus.

It is a still further object of this invention to provide a blending head for blending and heating fuel which can be used with a fuel treatment apparatus to heat fuel without utilizing the cooling system of an engine.

These as well as other objects are accomplished by the addition of a blending head to a fuel treatment apparatus wherein the blending head provides fuel for the apparatus through a fuel introducing conduit communicating with the bottom portion of the blending head and entering a settling chamber within the apparatus. The blending head contains a plurality of passages therein for blending return fuel from an engine with fuel going to the engine to heat the fuel to the engine and to allow the fuel to the engine to enter the fuel introducing conduit of the fuel treatment apparatus. The blending head eliminates the need for cooling system liquid by replacing the cooling liquid with return fuel from the diesel engine. The blending head is thermostatically controlled to prevent mixing when the temperature of the fuel going to the engine reaches a predetermined temperature.

DETAILED DESCRIPTION

It has been found in accordance with this invention that a fuel treatment apparatus having a blending head thereon can be provided which permits fuel going to an engine through the blending head to be heated by utilizing return fuel from the engine. Return fuel from the engine is blended with fuel going to the engine to heat the fuel. The blending of the fuels is thermostatically controlled so that the blending ceases when the fuel going to the engine reaches a predetermined temperature. Heated fuel from the blending head is permitted to pass through the fuel treatment apparatus where moisture and other contaminants are removed from the fuel. The fuel passes through the fuel treatment apparatus during normal engine operation, but is precluded from passing therethrough during periods of non-operation. Various other advantages and features will become apparent from a reading of the following description given with reference to the various figures of drawings.

Figure 1:
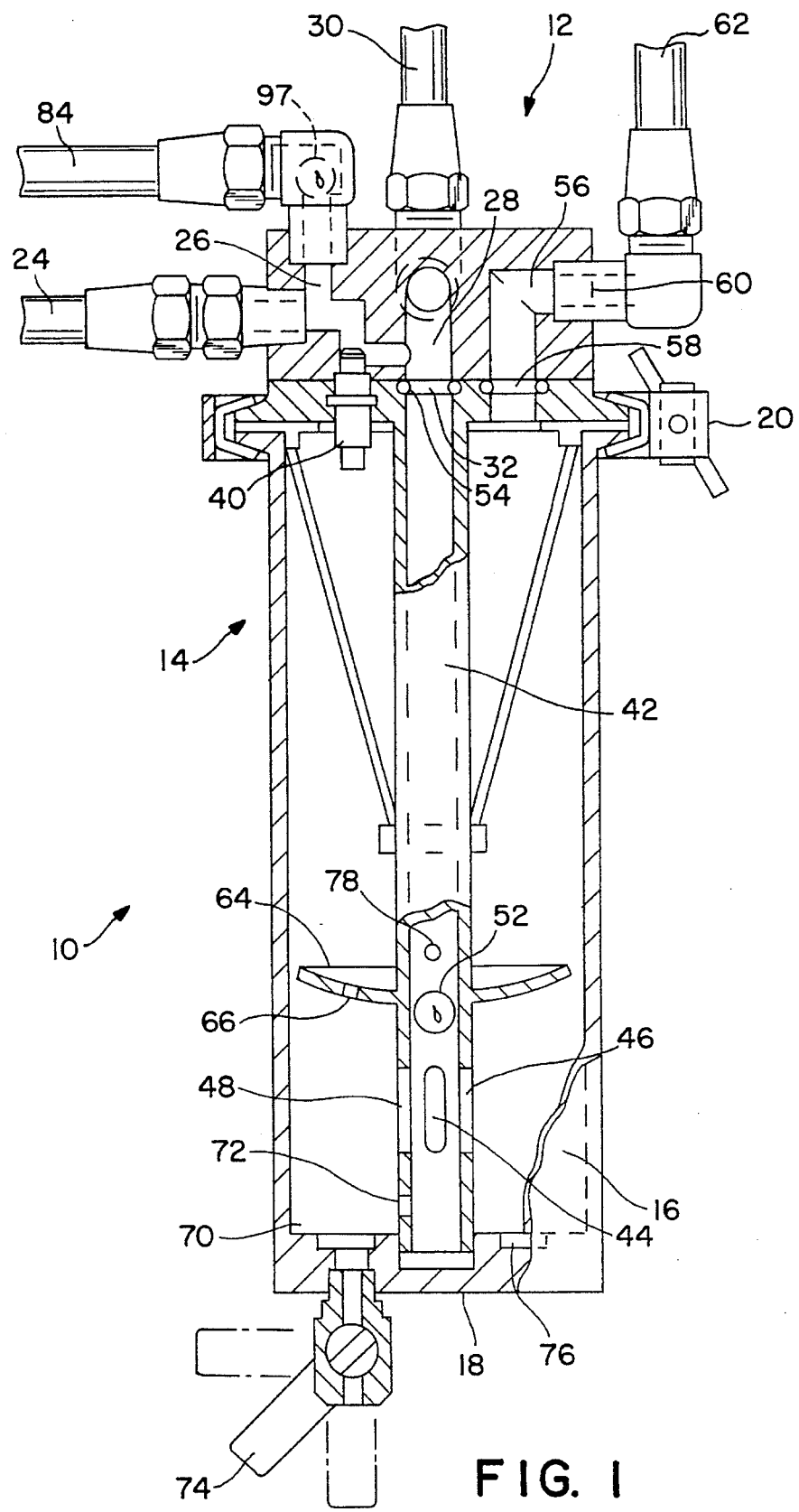
FIG. 1 of the drawings is a sectional view of a fuel treatment apparatus having a blending head thereon in accordance with this invention.

FIG. 1 of the drawings is a sectional view of the apparatus 10 and is a sectional view of an otherwise generally cylindrical-shaped apparatus. The structures illustrated in FIG. 1 are shown in the same plane for purposes of illustration.

Fuel treatment apparatus 10 comprises the subject of this invention which is a blending head 12 positioned above and functioning as a top for a fuel treatment apparatus as substantially taught and disclosed in U.S. Pat. No. 4,995,992, the disclosure which is hereby incorporated by reference. Blending head 12 is positioned above and acts as a top for means 14 defining a settling chamber which also includes a side wall 16 and a bottom 18.

Figure 3:
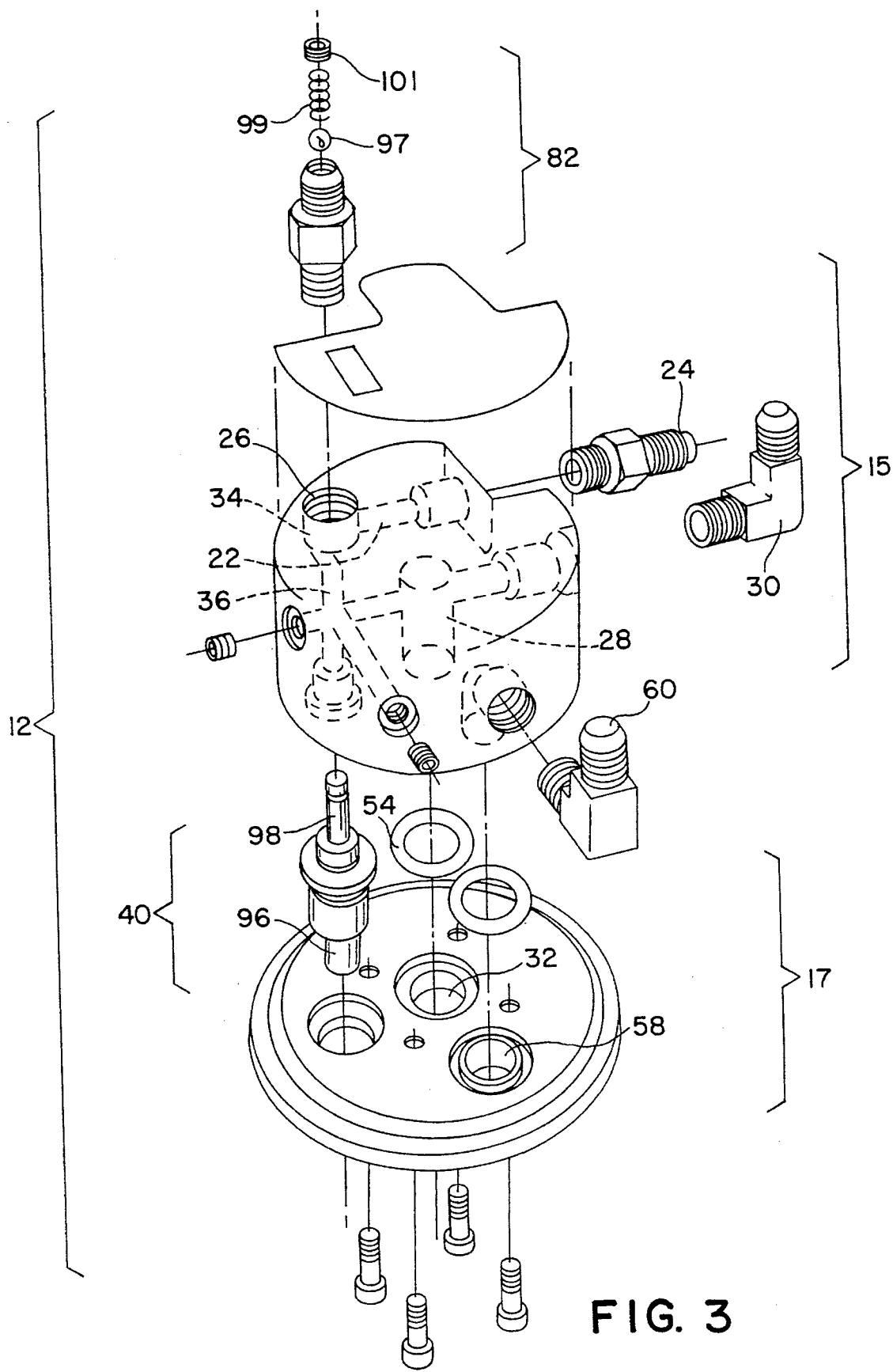
FIG. 3 of the drawings is a perspective view in partial phantom of the blending head in accordance with this invention.

Blending head 12 is preferably a unitary structure which is maintained in position on fuel treatment apparatus 10 by any conventional means such as clamping means 20 to thereby form a closed system within the fuel treatment apparatus. Blending head 12 has a plurality of passages defined therein including a first passage 22 which connects a first pair of openings 24 and 26 and a second passage 28 which connects a second pair of openings 30 and 32. First pair of openings 24 and second pair of openings 30 are preferably threaded to an extent from the beginning of each opening in order to allow a conduit means to be connected thereto. In order to allow fuels passing through first passage 22 and second passage 28 to blend, blending head 12 includes blending means illustrated as blending passage 34 which preferably is of a smaller diameter than the diameter of first passage 22 and second passage 28. Blending passage 34 includes a pair of openings 36 and 38, which are best illustrated in FIG. 3 of the drawings, and functions as a connector for first passage 22 and second passage 28.

In order to control the blending of fuels within first passage 22 and second passage 28, blending head 12 includes blocking means illustrated as thermostat 40 for blocking blending passage 34. Thermostat 40 consists of a chamber 96 which is filled with a thermally expandable fluid. As the temperature of the chamber 96 increases, the fluid expands thus causing a piston 98 to extend from the thermostat 40 and block blending passage 34 thus preventing mixing between the fuels in passages 22 and 28. Thermostat 40 allows blending of the fuels to be thermostatically controlled, and in the preferred embodiment, the thermostat is activated at approximately 80° F. to thereby block the blending effect and allow the fuels to flow through first passage 22 and second passage 28 without blending.

Blending head 12 taps into the hot return fuel line from an engine as the return fuel line is connected to opening 24 wherein return fuel is directed through first passage 22. Fuel from a tank which is being directed towards an engine is connected to opening 30 wherein the fuel passes through second passage 28. Blending passage 34 allows the hot return fuel flowing through first passage 22 to blend with cold fuel flowing from the tank and ultimately to the engine to thereby heat the fuel flowing to the engine. Once a predetermined temperature is reached, preferably approximately 80° F., thermostat 40 activates and completely blocks off blending passage 34 wherein the fuel coming from the tank and passing through second passage 28 is allowed to completely flow through opening 32 to continue on through the fuel treatment apparatus. Also, the return fuel flowing through first passage 22 is allowed to completely flow through opening 26 to return to the tank.

The process of heating the fuel going to the engine by utilizing return fuel from the engine as taught by this invention provides significant advantages over prior art devices including U.S. Pat. No. 4,995,992 which utilize water from the cooling system of the engine to heat fuel. By utilizing the hot fuel from the return line of the engine, resort to utilization of water from the cooling system is not necessary thereby eliminating the possibility of coolant contamination which is possible with any coolant type fuel heater. The associated costs of running the coolant lines are eliminated as well.

A conduit means 42 passes through the settling chamber of fuel treatment apparatus 10 and directly communicates with second passage 28 of blending head 12. Conduit means 42 defines a fuel inlet in the bottom of the chamber through slots 44 fully illustrated and 46 and 48 only partially illustrated.

Figure 2:
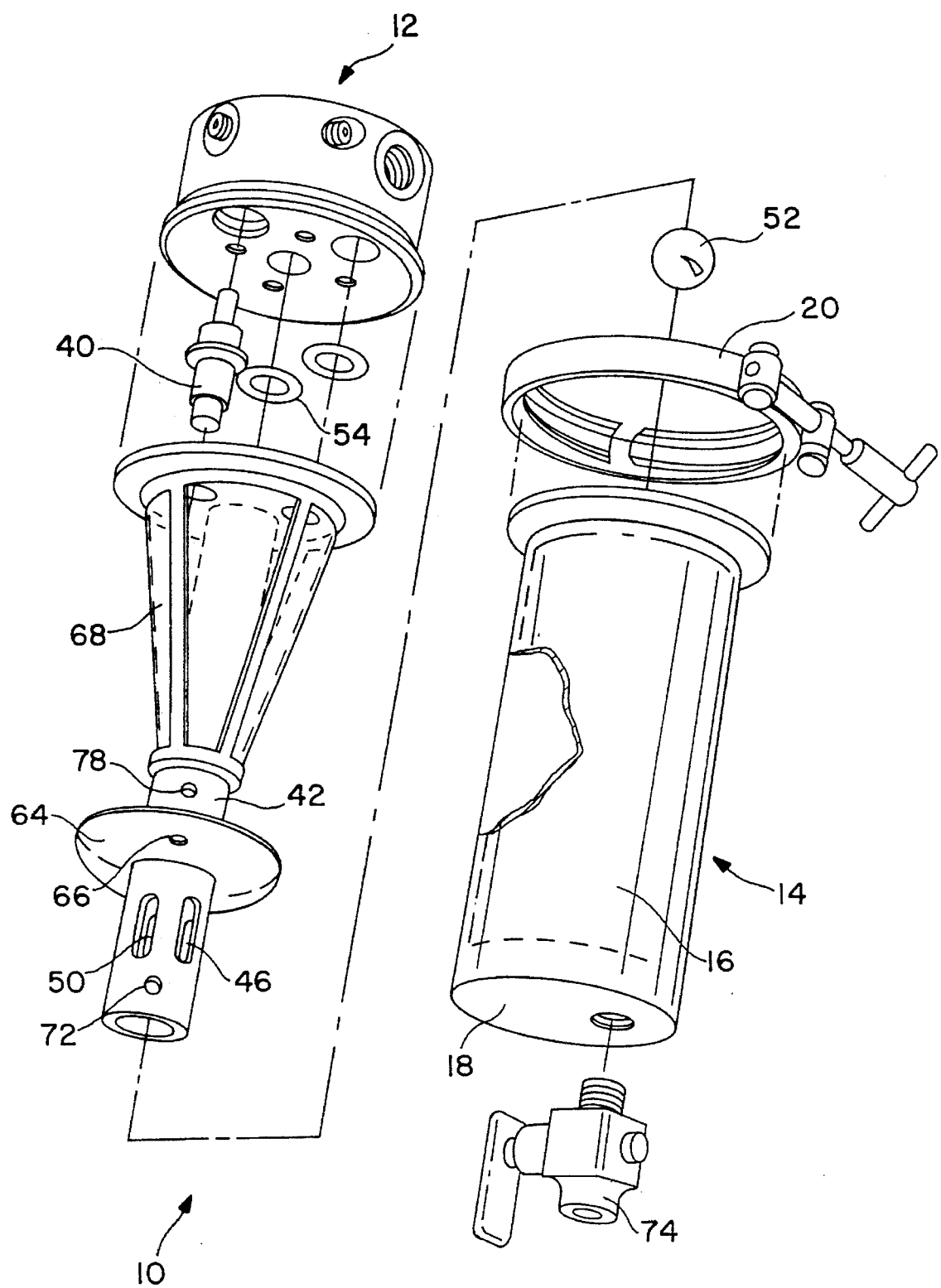
FIG. 2 of the drawings is an assembly view of the apparatus in accordance with this invention.

The assembly view of FIG. 2 better illustrates fuel inlets 46 and 50. It is thus seen that fuel travels from second passage 28 of the blending head into and through conduit means 42 and out the fuel inlets 44, 46, 48, and 50 located in a lower portion of the settling chamber. Conduit means 42 has located therein a buoyant valve means 52 which during non-operation and a full fuel condition floats up conduit means 42 to a restriction 54 in the form of an O-ring sealing the conduit means within the chamber. Thus, in operation, the buoyant valve means 52 is forced down to permit the fuel to flow through conduit means 42 and out the primary fuel inlets, but upon non-operation of the fuel engine, the buoyant valve means 52 floats upwardly through conduit means 42 and prevents fuel from passing through second passage 28 of blending head 12 and to conduit means 42.

The floatation time between the bottom or lower portion of the chamber as illustrated in FIG. 1 of the drawings to contact restriction 54 has a lag time preferably of about four (4) seconds. During this lag time, any debris within the fuel passes down conduit means 42 such that upon contact of buoyant valve means 52 with restriction 54, no debris remains to adversely affect the seal between buoyant valve means 52 and restriction 54.

Buoyant valve means 52 is illustrated here in the form of a metallic hollow shell ball of much the same form as a ping-pong ball so as to be buoyant within diesel fuel.

Thus, during normal operation, fuel from the tank enters blending head 12 at opening 30 and passes through second passage 28. The fuel passing through second passage 28 is heated by blending of the fuel with fuel passing through first passage 22 as the fuel within the second passage 28 continues to exit blending head 12 through opening 32 which communicates with conduit means 42. When thermostat 40 blocks off blending passage 34 to prevent the blending of fuels from first passage 22 and second passage 28, fuel flowing through second passage 28 flows therethrough without blending and into conduit means 42. Fuel passing through conduit means 42 contacts buoyant valve means 52 and forces it into a lower position. The fuel passes through fuel inlets 44, 46, 48, and 50. The fuel then passes from the chamber through an exit means which preferably comprises a third passage 56 defined within blending head 12 which connects a pair of openings 58 and 60. From the exit means, the fuel passes through a conduit 62 of conventional variety for use in a combustion engine.

Provided within the settling chamber for treatment of the fuel is a spreader 64 defining a drain orifice 66 therein and a water oil separator 68. These components are well described in U.S. Pat. No. 4,624,779, the disclosure which is hereby incorporated by reference.

During normal operation, moisture and other debris accumulate at the bottom of the settling chamber as at 70. Conduit means 42 has a means 72 therein to permit communication of moisture and debris with the bottom portion 70 of the settling chamber.

Located in the bottom of the settling chamber is drain means 74. The location of a drain means within a recess 76 greatly enhances the ability to drain water from the system. Recess 76 is in the form of an annulus in the bottom of the settling chamber. In actual operation, water droplets appear almost magnetically attracted to recess 76 for drainage through drain means 74.

During the draining process, buoyant valve means 52 is located against restriction 54 so that upon opening, siphoning of the system back through second passage 28 does not occur. Upon opening drain means 74, moisture drains from the system and is replaced by air which is quickly displaced upon engine operation.

Conduit means 42 defines a secondary fuel inlet 78 above the primary fuel inlets 44 through 50 which permits fuel to enter the system if accumulated water closes off primary inlets 44 through 50. The secondary inlet 78 is referred to as a weep hole and permits only a sufficient amount of fuel to enter the system so as to maintain idle speed.

The perspective view of FIG. 3 better illustrates the interior structure of the blending head 12. The blending head 12 is comprised of a plurality of passages including the first passage 22, the second passage 28, and the blending passage 34. Opening 38 allows the fuel in the first passage access to the blending passage 34. Openings 36 and 38 provide the fuel in the first passage 22 and the second passage 28 access to the blending passage 34. The blending passage 34 allows the fuel in passages 22 and 28 to mix thus raising the temperature of the fuel in passage 28 before its entry into the settling chamber 14. When the thermostat 40 reaches a predetermined temperature thus causing the thermostat 40 to close, the opening 36 of blending passage 34 becomes blocked and the fuel in passages 22 and 28 are no longer intermixed.

The blending head 12 may be comprised of a body 15 and a base 17 which can be screwingly engaged to form a tight connection. In addition, O-rings such as O-ring 54 can be used to prevent leaks and pressure losses in fuel streams flowing from the blending head 12 into the settling chamber 14. Thermostat 40 can be readily replaced by separating body 15 from base 17.

Opening 26 is fitted with a check valve 82 as shown in FIG. 3 to prevent siphoning from the fuel tank when the fuel treatment apparatus 10 is being drained. In addition, the check valve 82 can prevent siphoning during periods of non-operation and blending. Depending on the orientation of the check valve 82, a buoyant valve means 97 can be forced to close off opening 26 either by gravity or spring action 99. A hollowed plug 101 closes off the check valve and permits return fuel to flow to the fuel tank through conduit 84.

It is thus seen that the apparatus of this invention and the process which it conducts provides a novel apparatus for blending and heating fuel. It is also seen that the apparatus and process provided by this invention utilizes return fuel from an engine to heat fuel going to the engine. It is still further seen that this invention provides an apparatus and process for blending and heating fuel which can be used with a fuel treatment apparatus and wherein the blending of fuel within the apparatus occurs automatically. It is further seen that the present invention provides an apparatus for blending fuels which can be used with a fuel treatment apparatus to heat fuel without utilizing the cooling system of an engine.

As many variations will become apparent to those of skill in the art from a reading of the above description which is exemplary in nature, such variations are embodied within the spirit and scope of the following appended claims.

That which is claimed:

1. A fuel treatment apparatus for treating fuel having a blending head thereon said apparatus comprising:

means defining a settling chamber having a side wall and a bottom;

a blending head above said settling chamber, said blending head being a top for said settling chamber and comprising;

a plurality of passages therein, said plurality of passages including a first passage and a second passage, and blending means within said blending head communicatingly connecting said first and second passages;

conduit means communicating with said first passage and passing from said blending head through said chamber extending vertically downwardly to a lower portion of said chamber, said conduit means defining a fuel inlet in the lower portion of said chamber;

exit means communicating with an upper portion of said chamber and defining a fuel outlet; and buoyant valve means within said conduit means to permit fuel to flow in said inlet towards said outlet but to prevent fuel from flowing out of said inlet, said buoyant valve means movable within said conduit means from a point below said inlet to a point above said inlet near said blending head.

2. The fuel treatment apparatus according to claim 1 wherein said blending head further includes a third passage defined therein and wherein said third passage is said exit means.

3. The fuel treatment apparatus according to claim 1 wherein said blending means further comprises blocking means for blocking said blending means.

4. The fuel treatment apparatus according to claim 3 wherein said blocking means comprises a thermostat.

5. A fuel treatment apparatus for treating fuel having a blending head thereon wherein heated fuel flowing from an engine is utilized to heat fuel flowing to the engine, said apparatus comprising:

means defining a settling chamber having a side wall and a bottom;

a blending head above said settling chamber, said blending head being a top for said settling chamber and comprising;

a plurality of passages therein, said plurality of passages including a first passage and a second passage, and blending means within said blending head for communicatingly connecting said first and second passages;

inlet means in a bottom portion of said chamber for directing a flow of fuel into said chamber, said inlet means including buoyant valve means for permitting fuel to flow into said bottom portion while preventing fuel from flowing out of said bottom portion;

exit means communicating with an upper portion of said chamber for directing a flow of fuel out of said chamber; and an annular recess in said bottom portion of said chamber with said drain means in the bottom of the recess at the bottom of said chamber whereby drainage of water from said annular recess occurs in a direction opposite to the flow of fuel in said chamber.

6. The apparatus according to claim 5 wherein said blending head further comprises a third passage defined therein and wherein said exit means comprises said third passage.

7. A process for heating and treating fuel comprising the steps of:

providing an apparatus comprising;

means defining a settling chamber having a side wall and a bottom;

a blending head above said settling chamber, said blending head being a top for said settling chamber and comprising;

a plurality of passages therein, said plurality of passages including a first passage and a second passage, blending means within said blending head communicatively connecting said first and second passages;

conduit means communicating with said first passage said conduit means passing from said blending head and extending vertically downwardly to a lower portion of said chamber, said conduit means defining a fuel inlet in the lower portion of said chamber;

exit means communicating with an upper portion of said chamber and defining a fuel outlet; and buoyant valve means within said conduit means to permit fuel to flow in said inlet towards said outlet but to prevent fuel from flowing out of said inlet, said buoyant valve means movable within said conduit means from a point below said inlet to a point above said inlet near said blending head;

passing a first heated fuel through said first passage while passing a second fuel to be heated through said second passage whereby said fuels blend through said blending means thereby heating said second fuel;

introducing said second fuel into said conduit means, said second fuel forcing said buoyant valve means to travel down said conduit means past said inlet to permit said second fuel to flow through said inlet;

stopping the flow of said fuel thereby permitting said buoyant valve means to float up said conduit means past said inlet to close off said conduit means to fuel flow upon said buoyant valve means contacting a restriction in said conduit means; and sediment within said conduit means settling to the bottom of said buoyant valve means toward said restriction in said conduit means.

8. The process according to claim 7 further comprising the steps of:

said second fuel passing through said fuel inlet in the lower portion of said conduit means; and said second fuel passing through said exit means to exit said apparatus.

9. The process according to claim 7 wherein said blending head further includes blocking means for blocking said blending means, said blocking means comprising a thermostat, and further including the step of said thermostat blocking said blending means when said second fuel reaches a predetermined temperature.

* * * * *